May 12, 1931.  W. BAGGE  1,804,490
WHEEL GAUGE
Filed Aug. 23, 1927   2 Sheets-Sheet 1

INVENTOR
Walter Bagge;
BY Munn & Co.
ATTORNEY

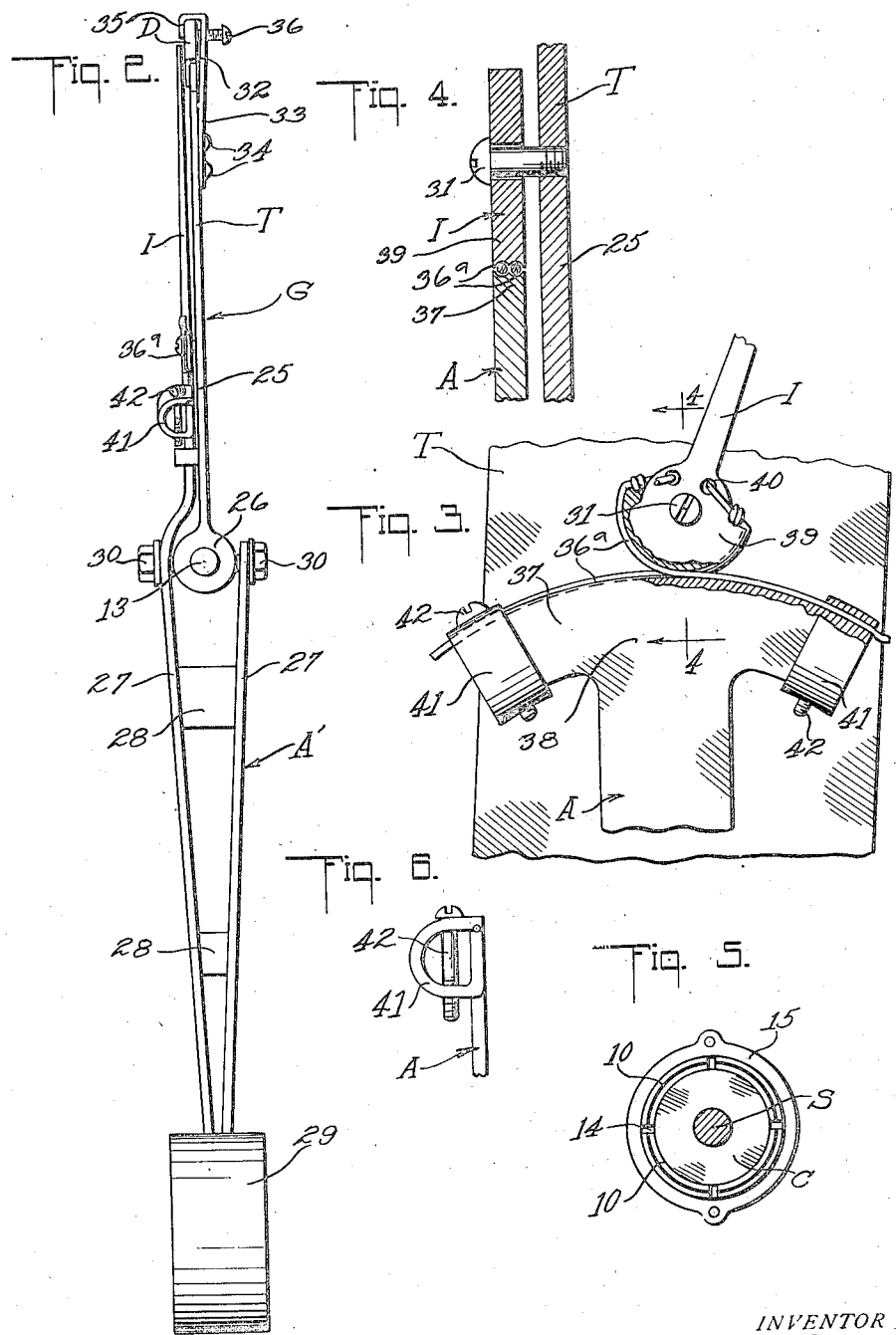

Patented May 12, 1931

1,804,490

UNITED STATES PATENT OFFICE

WALTER BAGGE, OF LOS ANGELES, CALIFORNIA, ASSIGNOR OF ONE-THIRD TO ERNEST BAGGE AND ONE-THIRD TO ARTHUR B. IMHOFF, OF LOS ANGELES, CALIFORNIA

WHEEL GAUGE

Application filed August 23, 1927. Serial No. 214,974.

My invention relates to and has for a purpose the provision of a gauge particularly adapted, although not necessarily, for use in determining the camber and caster of a vehicle's front wheels, and being associated with a wheel in such manner that an absolutely accurate indication of the camber and caster of the wheel will be rendered by the gauge regardless of whether the wheel runs true or not, the manner of association of the gauge with the wheel permitting the necessary adjustments, such as for instance bending or twisting of the axle of the wheel to correct inaccuracies in the camber or caster, to be made while the gauge remains in applied position and is rendering an accurate indication of the camber and caster existing in the wheel during the bending or twisting operation.

It is also a purpose of my invention to provide a gauge of the above described character embodying a mounting by which the gauge is adapted to be rigidly supported from the spindle of the wheel so that the spindle rather than the wheel will be employed as a basis for measuring of the camber and caster, the mounting being applied to or removed from the spindle with ease and dispatch and serving to firmly support the gauge upon an axis in perfect alinement with the axis of the spindle.

I will describe only one form of wheel gauge embodying my invention and will then point out the novel features in the claims.

In the accompanying drawing

Figure 2 is a view showing in side elevation the gauge embodied in Figure 1;

Figure 3 is an enlarged fragmentary view of an operative connection for an indicator comprised in the gauge;

Figure 4 is a sectional view taken on the line 4—4 of Figure 3 and looking in the direction of the arrows;

Figure 5 is a sectional view taken on the line 5—5 of Figure 1 and looking in the direction of the arrows;

Figure 6 is a fragmentary detail view of a clamp comprised in the gauge, and

Figure 1:
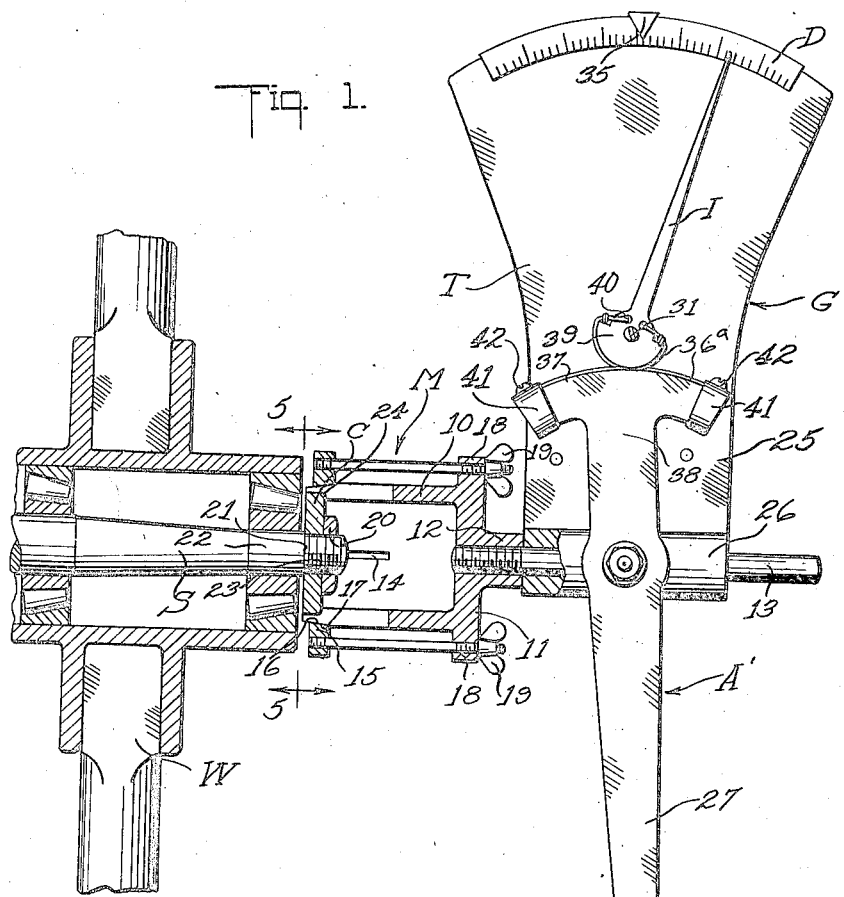
Figure 1 is a view showing in front elevation one form of wheel gauge embodying my invention in applied position to the spindle of a vehicle wheel.
Figure 7:
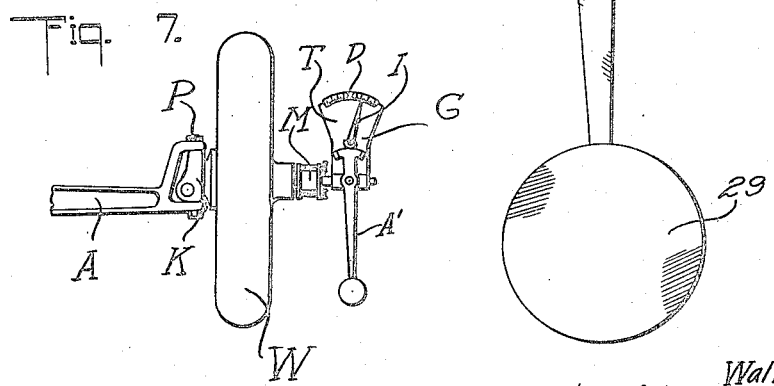
Figure 7 is a view showing a front wheel assembly of a vehicle with the gauge embodying my invention applied to the spindle of the wheel.

Referring specifically to the drawing in which similar reference characters designate similar parts in each of the several views, my invention in its present embodiment comprises a mounting designated generally at M by which the gauge designated generally at G is adapted to be supported on the spindle S of a vehicle wheel W, the spindle forming part of a steering knuckle K rotatably mounted on a king pin P journaled in the bifurcated end of the axle A of the vehicle as is conventional and will be understood.

The mounting M in the present instance comprises a cup shaped head 10 having its closed end or bottom 11 provided centrally with a hub 12 in which one end of an extension 13 in the form of a round shaft is secured to thereby support the shaft in axial alinement with the head as clearly shown in Figure 1. The head 10 is provided at circumferentially spaced intervals with a plurality of slots 14 extending inwardly from the open end of the head so as to form a plurality of flexible sections normally expanded and capable of being contracted to clampingly engage a collar C by means of a clamping ring 15 slidably mounted on the head 10, the inner periphery of the ring and the outer periphery of the head being correspondingly tapered as shown in Figure 1 to form co-acting cam surfaces 16 and 17 respectively. The ring is adapted to be moved longitudinally of the head by means of a pair of rods secured in the ring at diametrically opposed points and extending through ears 18 formed on the head. The free ends of the rods are threaded to receive thumb nuts 19, which when rotated on the rods in one direction engage the ears and then draw the rods and consequently the ring further onto the head, to cause the cam surfaces 16 and 17 to co-act in contracting the free end of the head into clamping engagement with the collar C. In the application of the mounting M to the spindle S, the usual hub cap of the wheel (not shown) and nut 20 of the spindle are first removed, the collar C then being applied to the spindle to occupy the position shown in Figure 1 in which the collar abuts the usual shoulder 21 formed between the smooth portion 22 of the spindle and its reduced threaded end 23, after which the nut 20 is again threaded on the end 23 and tightened to clamp the collar C upon the spindle. The head 10 is now extended upon the collar until the latter seats against an internal annular shoulder 24 in the head formed by annularly grooving the latter, after which the nuts 19 are rotated to clamp the mounting rigidly to the collar, with the longitudinal axis of its extension 13 disposed in alinement with the spindle S.

The gauge G embodying my invention comprises a support T in the present instance in the form of a metal plate 25 provided at one end with a sleeve 26 adapted to freely receive the extension 13 of the mounting M so that the plate will be supported on the extension for rocking movement. An actuating member in the form of an arm designated generally at A' is in the present instance formed of a pair of flat metal members 27 secured together at intervals and in inclined relation by cross bars 28, the lower end of the members converging and being provided with a weight 29, while the upper end of the members freely receives therebetween the sleeve 26. A pair of trunnions in the form of headed screw studs 30 extends through openings in the members and are then threaded into the sleeve 26, so that the arm A' is mounted for rocking movement on the support about an axis at right angles to and intersecting the longitudinal axis of the sleeve 26, and with the weight 29 broadly constitutes a pendulum.

Pivotally mounted on a stud 31 threaded into the plate 25 is an indicator I in the form of a relatively short arm having a pointed free end adapted to move across a graduated dial D constructed of a strip of metal of arcuate form and having one longitudinal edge provided with a flange 32. The dial is detachably secured upon the front side of the plate 25 by means of a member 33 in the form of a strip of metal secured to the back side of the plate by rivets 34 and having its upper end bent upon itself in spaced relation to provide a lip 35 overlying the plate and adapted to be forced into engagement with the dial D by means of a screw 36 threaded into the member 33 and bearing against the plate, so as to clamp the dial to the plate with the flange 32 of the dial resting upon the corresponding arcuate shaped end of the plate 25. By detachably securing the dial D to the plate 25 in this manner the dial can readily be removed and any one of other similarly shaped dials (not shown) and bearing different graduations can be substituted to accommodate the gauge to wheels of different diameters.

Rocking movement of the arm A' is transmitted to the indicator I by means of a pair of flexible wires 36ª trained in crossed relation to each other about an arcuate portion 37 formed on the extended upper end 38 of the arm A', concentric with the axis of the arm, and an arcuate portion 39 forming the hub of the indicator as clearly shown in Figure 3. The arcuate portions of the arm and indicator are each provided with a pair of grooves in side by side relation and receiving the wires so as to prevent lateral displacement of the latter, the wires being threaded through openings 40 in the indicator and then twisted upon themselves to secure one end of each of the wires to the indicator at opposite sides of its pivot. The wires are clamped at their other ends to the opposite ends of the arcuate portion 37 of the arm A', by means of clamping tongues 41 constituting lateral extensions on the ends of the arcuate portion which are curled upon themselves as shown in Figure 6, so that their free ends are adapted to overlie the edge of the arcuate portion. Each of the tongues is provided with a pair of registering openings, the lower one of which is threaded, and a screw 42 is extended through the openings and operates to force the free end of the respective tongue into clamping engagement with the end of the respective wire. This manner of clamping the wires to the arm A' permits initial adjustment of the indicator I with respect to the arm when assembling, or subsequent adjustment should stretching of the wires occur.

The operation of the gauge is as follows: It will be clear that with the gauge G supported on the mounting M as illustrated in Figure 1, a universal mounting of the arm A' is obtained due to the fact that the support T is free to rock about the axis of the extension 13, while the arm is free to rock about its trunnions 30 at right angles to the plane of movement of the support, so that the arm by the provision of its weight 29 constitutes, a plumb bob constantly acting to maintain a perpendicular position.

Assuming that no camber is present in the wheel, and with the latter facing directly forward, the arm A' as well as the indicator I will occupy vertical positions, the indicator pointing directly at the clamping lip 35 which serves as a zero mark on the graduations of the dial D. Should the wheel have camber or in other words incline from the perpendicular due to an inclination of the spindle S from the horizontal, as is shown in Figure 1, the support T will be likewise inclined from the horizontal, while the arm A' will maintain its vertical position. The indicator I, through the medium of its operative connection with the arm A', will however now be inclined from a vertical an amount proportional to the movement of the arm A' with respect to the support T so as to indicate on the graduations of the dial D the amount of camber existing in the wheel.

To determine the caster of the wheel resulting from an inclination of the king pin P from a vertical downwardly and forwardly of the vehicle, the gauge is allowed to remain in applied position and the wheel swung about the axis of the king pin first to one extreme position and then to the other. Should caster exist in the wheel the support T will be rocked about the extension 13 during steering movement of the wheel due to the action of the arm A' in maintaining a vertical position, the relative movement of the support and arm being transmitted to the indicator by the wires 36ª. It is only necessary for the operator to note the position of the indicator on the dial when the wheel is in both of its extreme positions, the difference in the two readings being the caster as existing in the wheel. Should no caster be present the indicator will remain stationary with respect to the dial, its position on the latter in this instance being determined solely by the amount of camber present in the wheel.

It will be understood that although I have illustrated and described but one gauge and one mounting, that in actual practice two of each would be used so that both front wheels of the vehicle could be tested simultaneously and the required adjustments, if any, be made from a consideration of the readings of both gauges. It will further be manifest that my invention broadly speaking, provides a gauge mounting adapted to be secured to a vehicle wheel spindle with the utmost ease and dispatch to support a gauge in a predetermined relationship to the spindle, and further provides a gauge capable of being supported on the mounting with the parts of the gauge so functionally related to each other and to the mounting that a true and accurate indication of the camber and caster existing in the wheel will be effected by the gauge.

Although I have herein shown and described only one form of wheel gauge embodying my invention, it is to be understood that various changes and modifications may be made therein without departing from the spirit of the invention and the spirit and scope of the appended claims.

I claim:

1. In combination, a gauge mounting, means for securing the mounting to the spindle of a vehicle wheel, and a gauge comprising a support having a dial thereon, means for mounting the support on the gauge mounting for movement about an axis in alinement with the wheel spindle, a member, means for mounting the member on the support for movement about a second axis at a right angle to the first mentioned axis, means on the member weighted so as to maintain a predetermined position irrespective of the camber or caster of the wheel, an indicator mounted on the support, and means for operatively connecting the last means to the indicator to cause the latter to indicate on the dial the camber or caster of the wheel.

2. In combination, a gauge mounting, means for securing the mounting to the spindle of a vehicle wheel, and a gauge comprising a support having a dial thereon, means for mounting the support on the gauge mounting for movement about an axis in alinement with the wheel spindle, a weighted arm, means for mounting the arm for pivotal movement on the support about an axis at right angles to the first mentioned axis and so that the arm will be free to maintain a predetermined position irrespective of the camber or caster of the wheel, an indicating arm pivotally mounted on the support for movement over the dial, and means for operatively connecting the weighted arm and indicating arm so that the latter will respond to movement of the former to indicate on the dial the camber or caster of the wheel.

3. In combination, a gauge mounting, means for securing the mounting to the spindle of a vehicle wheel, and a gauge comprising a support having a dial thereon, means for mounting the support on the gauge mounting for movement about an axis in alinement with the wheel spindle, a member, means for mounting the member on the support for movement about a second axis at a right angle to and intersecting the first mentioned axis, means on the member weighted so as to maintain a predetermined position irrespective of the camber or caster of the wheel, an indicator mounted on the support, and means for operatively connecting the last means to the indicator to cause the latter to indicate on the dial the camber or caster of the wheel.

4. In combination, a gauge mounting comprising a head having an extension and means for securing the head to the spindle of a vehicle wheel with the longitudinal axis of said extension disposed in alinement with the longitudinal axis of the spindle, and a gauge carried by the extension and comprising a support having a dial thereon and mounted on said extension for rocking movement about the axis of the latter, means mounted on the support for rocking movement about an axis at right angles to and intersecting the axis of the extension, said means being weighted so as to maintain a fixed position relative to the vertical irrespective of the camber or caster of the wheel, an indicator mounted on the support, and means for operatively connecting said means to the indicator to cause the latter to indicate on the dial the camber or caster of the wheel.

5. In combination, a gauge mounting comprising a head having an extension and means by which the head is adapted to be secured to the spindle of a vehicle wheel to dispose the longitudinal axis of the extension in longitudinal alinement with the spindle, and a gauge comprising a support having a dial thereon and mounted on the extension for rocking movement about its axis, a weighted arm mounted on the support for rocking movement about an axis at right angles to and intersecting the axis of the extension, an indicating arm pivotally mounted on the support and movable over said dial, and an operative connection between the arms by which the movement of the weighted arm is transmitted to the indicating arm.

6. A gauge of the character described comprising a support including a plate having a graduated dial thereon and a sleeve by which the support is adapted to be mounted for rocking movement upon an extension of a gauge mounting, a weighted arm pivotally mounted on the sleeve upon an axis at right angles to and intersecting the longitudinal axis of the sleeve, an indicating arm pivotally mounted on the plate, and a pair of reversely disposed cables connected to the arms in a manner to transmit movement of the weighted arm to the indicating arm.

7. A gauge as embodied in claim 6, wherein said dial comprises an arcuate shaped strip, and means is provided for detachably securing the strip to one side of the plate which comprises a member secured to the plate and having one end thereof free and bent upon itself to overlie an edge of the plate, and a screw threaded into the member and acting when rotated into engagement with the plate to move the bent free end of the member into binding engagement with the strip.

8. In a device of the character described, a mounting comprising a head having an extension upon which a gauge is adapted to be supported, and means by which the head is adapted to be detachably secured to the spindle of a vehicle wheel with the longitudinal axis of said extension disposed in alinement with the longitudinal axis of the spindle.

9. In a device of the character described a mounting comprising a cup shaped head having a shaft projecting axially from its closed end, upon which a gauge is adapted to be mounted, said head being split from its open end inwardly at circumferentially spaced intervals to provide a plurality of relatively contractible sections, a collar adapted to be detachably secured to the axle of a vehicle wheel and over which the open end of the head is adapted to be extended, a ring mounted for movement on said head, co-acting cam surfaces on said head and ring, and means for effecting movement of the ring on the head to cause said cam surfaces to move said contractible sections into clamping engagement with said collar.

10. In a device of the character described a mounting comprising a cup shaped head having a shaft projecting axially from its closed end, upon which a gauge is adapted to be mounted, said head being split from its open end inwardly at circumferentially spaced intervals to provide a plurality of relatively contractible sections, a collar adapted to be detachably secured to the axle of a vehicle wheel and over which the open end of the head is adapted to be extended, a ring mounted for movement on said head, ears on said head, threaded rods secured to the ring and extending through said ears, co-acting cam surfaces on said head and ring, and nuts on said rods adapted when rotated in one direction to engage said ears and thereby move said ring relative to the head to cause the contractible sections of the latter to clampingly engage said collar.

11. In a device of the character described, a mounting comprising a cup shaped head having an extension on which a gauge is adapted to be supported, means for rendering the head contractable, a member adapted to be secured to the spindle of a vehicle wheel and capable of being received in the head, and means for contracting the head into clamping engagement with the member so as to secure the mounting to the member with said extension in axial alinement with the wheel spindle.

12. In combination, a gauge mounting, means for securing the mounting to the spindle of a vehicle wheel, a support, means for mounting the support on the gauge mounting for movement about an axis in alinement with the wheel spindle, a pendulum, means for mounting the pendulum on the support for movement about an axis at right angles to the first mentioned axis so that the pendulum constantly acts to maintain a predetermined position irrespective of the camber or caster of the wheel, and means operable in response to relative movement between the support and pendulum to indicate the camber or caster of the wheel.

13. In combination, a gauge mounting, means for securing the mounting to the spindle of a vehicle wheel, a support, means for mounting the support on the gauge mounting for movement about an axis in alinement with the wheel spindle, a pendulum, means for mounting the pendulum on the support for movement about an axis at right angles to the first mentioned axis so that the pendulum constantly acts to maintain a predetermined position irrespective of the camber or caster of the wheel, means operable in response to relative movement between the support and pendulum to indicate the camber or caster of the wheel, and comprising an indicator mounted for rocking movement on the support, means for operatively connecting the indicator to the pendulum for movement by the latter, and a dial on the support with which the indicator coacts.

14. In combination, a gauge mounting, means for securing the mounting to the spindle of a vehicle wheel, a weighted arm, means for mounting the arm on the gauge mounting for movement about an axis in alinement with the wheel spindle and about an axis at right angles to and intersecting the first mentioned axis, and means operable in response to relative movement between the weighted arm and last means to indicate the camber or caster of the wheel.

15. In combination, a gauge mounting having a portion on which a gauge is adapted to be mounted, means for securing the mounting to a wheel spindle with said portion disposed in axial alinement with the spindle, a pendulum, means for mounting the pendulum on said portion for rocking movement, indicating means, and means for operatively connecting the indicating means to the pendulum for actuation by the latter to indicate the camber or caster of the wheel.

16. In combination, a gauge mounting, means for securing the mounting to a wheel spindle, a gauge carried by the mounting and including an actuating member and means for mounting the actuating member for rocking movement about an axis at a right angle to and intersecting the longitudinal axis of the wheel spindle.

17. In combination, a gauge mounting, means for securing the mounting to a wheel spindle, a gauge comprising means for mounting the gauge on said mounting for rocking movement about an axis alined with the longitudinal axis of the wheel spindle, the gauge also including an actuating member and means for mounting the actuating member for rocking movement about an axis at a right angle to and in intersecting relation to the first mentioned axis.

18. The combination with a gauge including a support; means for mounting the support for rocking movement about an axis alined with the longitudinal axis of a wheel spindle; the gauge including indicating means, an actuating member for the latter, and means for mounting the actuating member on the support for rocking movement about an axis at a right angle to and in intersecting relation to the first mentioned axis.

WALTER BAGGE.